Figure 1:
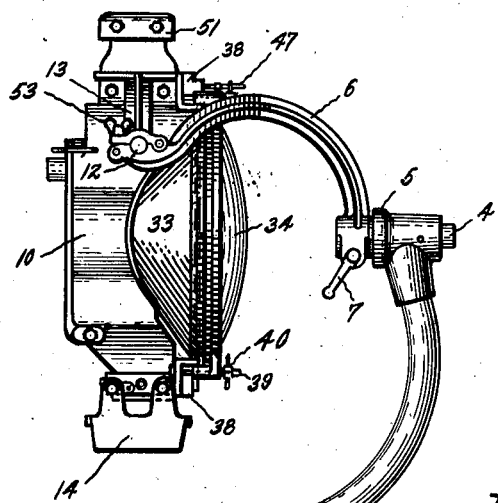

June 16, 1931. C. A. B. HALVORSON, JR 1,810,604
LIGHT PROJECTOR
Filed Feb. 28, 1924   3 Sheets-Sheet 1

Inventor,
Cromwell A. B. Halvorson Jr,
by
His Attorney.

June 16, 1931. C. A. B. HALVORSON, JR 1,810,604
LIGHT PROJECTOR
Filed Feb. 28, 1924 3 Sheets-Sheet 2

Inventor,
Cromwell A. B. Halvorson Jr.,
by
His Attorney.

June 16, 1931.  C. A. B. HALVORSON, JR  1,810,604
LIGHT PROJECTOR
Filed Feb. 28, 1924   3 Sheets-Sheet 3
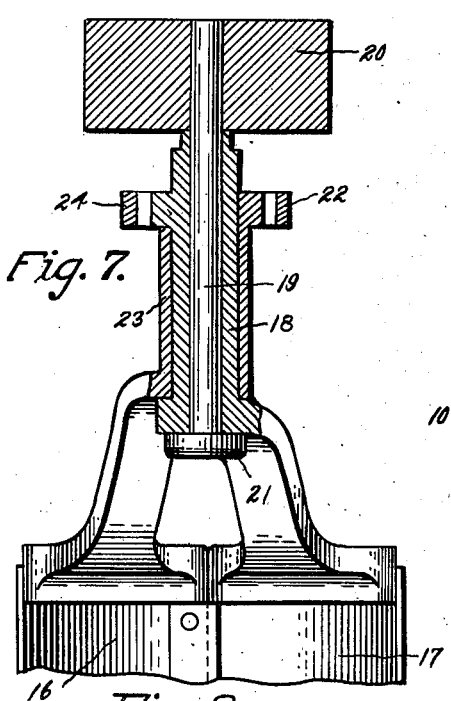
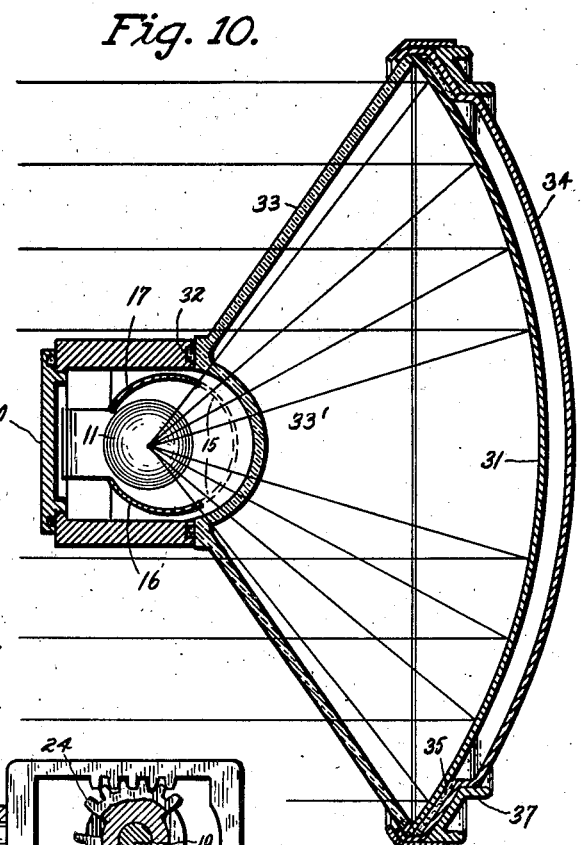
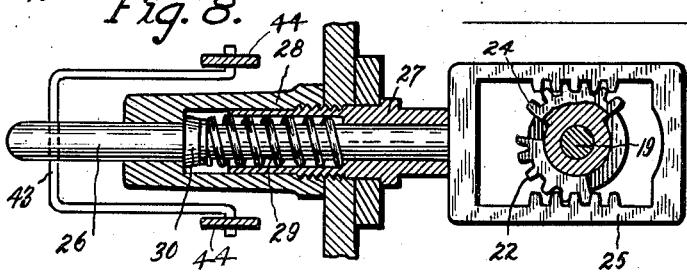
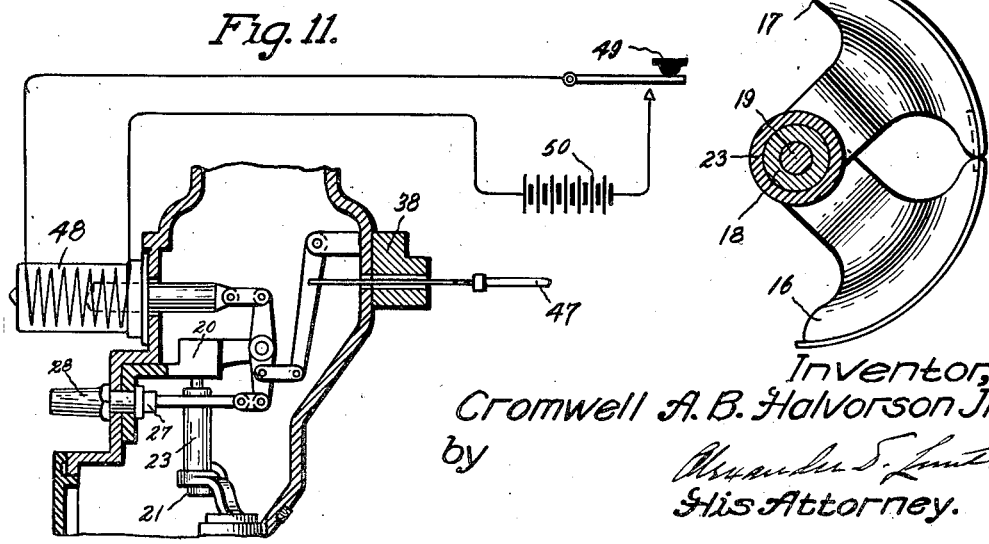
Inventor,
Cromwell A. B. Halvorson Jr.,
by
His Attorney.

Patented June 16, 1931

1,810,604

UNITED STATES PATENT OFFICE

CROMWELL A. B. HALVORSON, JR., OF LYNN, MASSACHUSETTS, ASSIGNOR TO GENERAL ELECTRIC COMPANY, A CORPORATION OF NEW YORK

LIGHT PROJECTOR

Application filed February 28, 1924. Serial No. 695,868.

Heretofore light projectors have been made having mirrors of various sorts, sometimes of glass and sometimes of metal. In the case where metal mirrors are used, various expedients have been devised to minimize or prevent the corrosion of the reflecting surface and to prevent any obstructing matter, such as dirt, from coming into contact with the reflecting surface. For instance, a lacquer has been sometimes used to protect the surface, but it has been found that it becomes overheated and deteriorates when used in connection with a high intensity type of arc. Furthermore, as it ages, it absorbs a larger percentage of the light, thereby impairing the efficiency of the instrument. The objections mentioned in the foregoing become particularly marked when the source of light in a projector has to be occulted while the light is on as in the case where the projector is used as a signalling device.

In order to overcome these objections, I have provided a metal mirror which is covered by a glass element in such a manner that the mirror is sealed. In this connection, I have found that a curved hood is preferable to a flat one inasmuch as the curved form is less liable to crack. In the case of a projector in which the source of light is a high powered electric lamp of the bulb type enclosed in a housing and in which the source of light must be occulted between signals and in particular when the signalling device is to be used subject to weather conditions or subject to spray from sea water, it is very important to have the mirror and the housing effectively sealed. I have found that although one individual glass piece may be used for the housing and a separate glass piece for sealing the reflector, much better results are obtained where a unit piece of glass is used for both. A much more efficient construction results in the latter case inasmuch as the light does not have to pass through the glass twice. In order to accomplish the foregoing I provide a single sealed hood common to the housing and to the reflector.

It is an object of my invention also to provide other details of improvement tending to increase the efficiency and serviceability of a projector of the above character.

The means for accomplishing the results of my invention are hereinafter more fully set forth and claimed.

Figure 2:
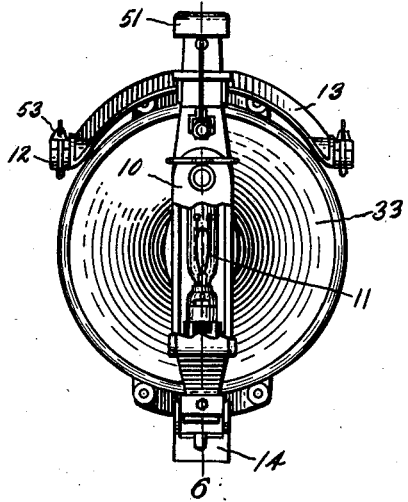
Figure 3:
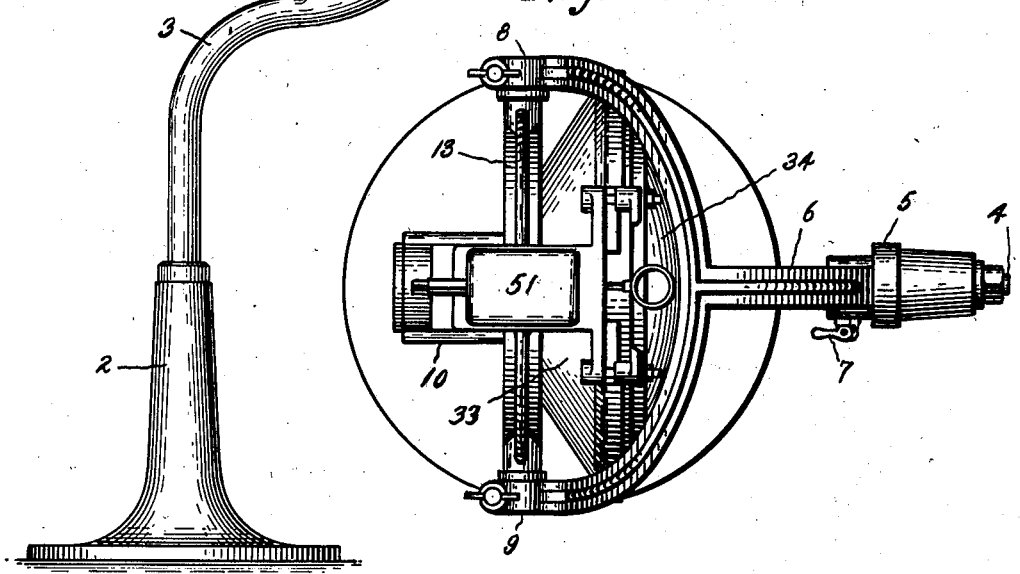
Figure 4:
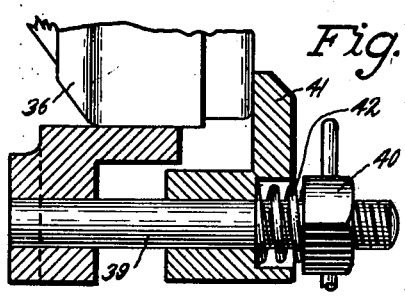
Figure 5:
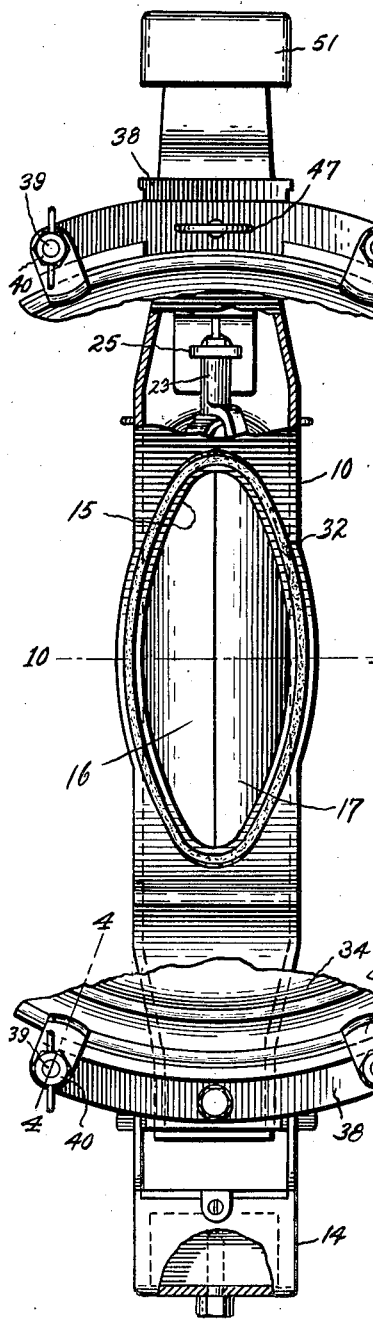
Figure 6:
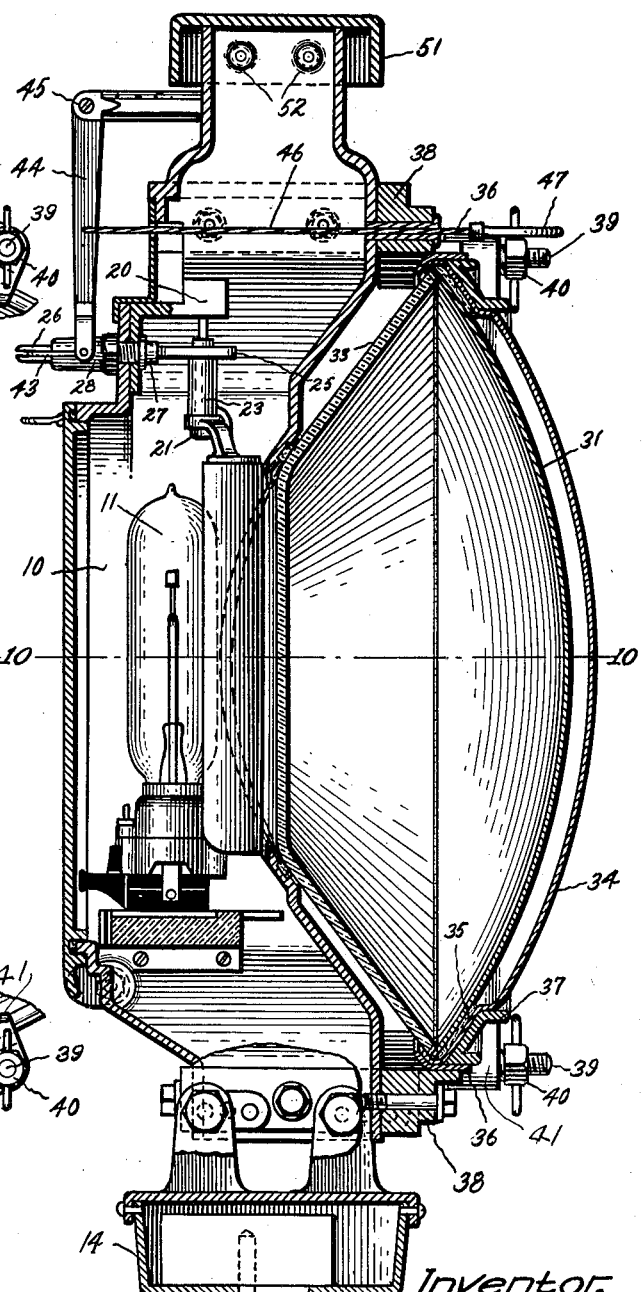

In connection with the specification, I wish to make reference to the accompanying drawings in which Fig. 1 is a side elevation of the signalling lamp and its pedestal; Fig. 2 is a front elevation of the lamp without the pedestal; Fig. 3 is a plan view of the device, Fig. 1; Fig. 4 is a fragmental view of the reflector clamping device in section and designed to show the flexible contact of the clamp to allow for expansion of the glass as a result of the heat of the lamp; Fig. 5 is a rear elevation with the reflector broken away showing the clamps for holding the reflector frame in position. In this figure the shutter used for signalling is shown through an opening in the casing. This figure also shows the weather strips. The lamp casing is broken away to show part of the shutter operating mechanism. In the lower part, this figure shows the balancing weight which is used to maintain the lamp casing in balanced condition; Fig. 6 is a cross section through the lamp casing and through the reflector showing the water protecting globe; Fig. 7 is a cross section through the shutter operating mechanism; Fig. 8 is a plan view of the shutter operating mechanism; showing how the shutter is controlled in one direction by hand, or electrically, and in the opposite direction by a spring. This figure also shows the rack through which movement is communicated to the shutter by means of the segmental gear construction; Fig. 9 is a plan view of the shutter; Fig. 10 is a cross section of the casing showing the shutter operating mechanism in modification; and Fig. 11 shows a form of the shutter-operating mechanism.

Referring more in detail to the drawings, in Fig. 1 the projector is shown mounted on an arm 3 pivotally mounted on the base 2 and may be rotated about a vertical axis, that is, an axis perpendicular to the base. On the upper end of the arm 3 there is a horizontally disposed shaft 4, one end of which projects to the left beyond the collar 5. To the projecting end of the member 4 a bifurcated arm 6 (see Fig. 3) is suitably secured by means of a clamp having a lever 7. The terminals 8 and 9 of the arm 6 are adapted to serve as bearings for receiving the housing 10 in which the incandescent lamp 11 is located (see Fig. 6). The housing 10 is provided with suitable bearing stubs 12 on the ends of the curved member 13 located on the upper part of the housing, and forming a part of said housing. It will be observed that these bearings 12 are above the central portion of the housing. About these bearings 12 as a horizontal axis, the housing may be rotated. In order to properly balance the housing, there is secured to the under part of the housing a balancing weight 14. The front part of the housing is provided with an elliptical opening 15 (see Fig. 5) through which the signalling shutters 16 and 17 can be seen. As shown in Fig. 7, these shutters project down from a suitable bearing. For example, the shutter 17 terminates in a hollow bearing 18 which rotates about the pin 19. This pin is secured to a projecting member 20 secured to the housing. The lower portion of the pin is provided with a collar 21 which serves to hold the hollow bearing 18 in place. As an integral part of the bearing 18, there is a segmental gear 24 through the medium of which the shutter 17 is operated, as will presently appear. The bearing 18 serves in turn as a support for the bearing 23 of the shutter 16 with which the shutter is integral. Furthermore, a segmental gear 22 is also integral with the bearing 23 which gear 22 serves for operating the shutter 16. As shown in Fig. 8, the gears 22 and 24 are offset and work within the rack frame 25. The rack 25 is provided with a shaft 26. This shaft is held in a suitable bearing construction in the framework, which construction comprises the elements 27 and 28. It will be seen that within this bearing there is provided a spring 29, which spring normally tends to retain the rack against the element 27 in view of the fact that the shaft 26 is provided with a collar 30, which collar is rigidly secured to the shaft 26. With this construction, it will be seen that by moving the rack 25 back and forth, the gear segments 22 and 24 on the oscillating pin 19 and consequently the shutters 16 and 17 will be operated with the result that signals may be transmitted by interrupting the light between the lamp 11 and the reflector 31 (see Fig. 10). In Fig. 10 the shutters are shown open and therefore the light from the lamp 11 is shown passing through to the reflector and extending to the left in the shape of a beam on either side of the housing 10.

Referring to Fig. 5, it should be noted that around the opening 15 there is provided an oval shaped packing 32 which, as presently will appear, serves to prevent water from trickling into the housing between the glass casing or hood that protects the reflecting surfaces and the housing. As indicated in Figs. 10 and 6, the protecting glass hood 33 flares out from the housing toward the rim of the reflector 31. On the side of the housing the glass curves about the housing 10 forming an annular shield 33' in front of the opening 15. Between the annular shield 33' and the inner terminal of the sloping sides of the glass, there is provided a ridge construction, the lips of which coincide with the rim of the opening 15. Between these lips and the housing there is interposed the packing 32.

The reflector 31 is provided preferably with a silver reflecting surface which may be backed and reinforced in any suitable manner as for example with copper and with any other additional reinforcing material behind that. As shown in the drawings, the reflector is protected in the rear preferably by a metallic casing 34. Between the casing 34 and the reflector proper there is provided a cushion 35 of any suitable resilient material. The reflector 31 and the glass 33 are held together as a unit by the casing 34, the rim of which is spun over the edge, as indicated. This rim is reinforced and made tight by annular retaining rings 36 and 37, Figs. 6 and 10. Furthermore, the glass shield 33 is suitably sealed where it comes in contact with the reflector to preserve the enclosure air tight. If desired, the enclosure may be held under reduced pressure, that is, in a state of partial vacuum. It will thus be seen that the reflector surface with its protective glass and metallic auxiliaries forms a unit, which unit is held in position within the ring 38 by clamps 41 held by studs 39 and nuts 40 disposed around the rim of the unit and secured to the housing. Furthermore, between the clamps 41 and the nuts 40, I provide cushion springs 42 in order to permit the unit to expand and contract under the influence of the heat generated or produced by the source of light or otherwise.

Referring to the shutter construction and the method of operating the shutters for the purpose of signalling, it will be observed that the shaft 26, Fig. 8, is engaged by a U-shaped member 43, the ends of which are secured to the lower extremities of the bifurcated arm 44, Fig. 6, which arm 44 is pivoted at the point 45. It will be observed that the arm 44 has connected to it midway between the shaft 26 and the pivot 45, a rod 46 which terminates in a handle 47. By pulling the handle, the shaft 26 is forced to the right with the result that the shutters 16 and 17 are drawn open to a position indicated in Fig. 10. Upon releasing the handle 47, the spring 29 restores the rack to its normal position, Fig. 8, thereby closing the shutters 16 and 17. The closed position of these shutters is indicated in Fig. 9.

The control of the rack 26 may be varied, as indicated in Fig. 11, with the pivoted arm located just behind the cleats 38, instead of as on the opposite side as shown in Fig. 6. With this construction, shutters may be operated electrically by means of an electromagnet such as the electromagnet 48, the latter being under the control of a suitable key 49 and in series with a suitable battery 50. With the arrangement shown in Fig. 11 it is obvious that the shutters may be operated with equal facility either by handle 47 or by the electromagnet 48.

It will thus be seen that I have devised a simple, inexpensive and rugged mechanism which may be used for signalling purposes, and which may not be detected, being completely occulted, except during the time the signals are being actually transmitted. It should be pointed out that provision is made for ventilating the housing. This is done by providing in the upper part of the housing, Fig. 6, just below the cap 51, a series of openings 52 through which the hot air may be passed out. Suitable openings are also provided in the lower part of the housing below the lamp 11 to admit the cool air and to enable the draft to circulate. With the construction shown and described, referring in particular to Fig. 1, it will be seen that the signalling device may be rotated as a whole about an axis perpendicular to the base 2 and at the same time may be rotated about the horizontal axis through the bearings 12. In this connection, I will point out that I provide suitable clamps 53 for clamping the housing in any tilted position about the horizontal axis.

I wish it understood that although I have shown my invention in connection with a specific type of construction, I do not wish to be so limited inasmuch as in view of the disclosure, modifications will readily suggest themselves to those versed in this art without departing from the scope of the claims appended hereto.

What I claim as new and desire to secure by Letters Patent of the United States, is:

1. In a projector, a metallic reflecting surface in the form of a surface of revolution, said surface extending in one direction, a transparent hood covering said reflecting surface, means for sealing the reflector and the hood together to form a sealed closure for the reflecting surface, said hood having a section of its surface also in the form of a surface of revolution extending in the opposite direction from that of the reflecting surface and having an axis common with that of the reflecting surface, said reflecting surface having a focal point lying outside of said hood, a source of light at the focal point of said reflector, a second section of said hood also in the form of a surface of revolution about an axis non-coincident with said first axis, said elements being located in cooperative relation.

2. In a projector, a metallic reflecting surface in the form of a surface of revolution, said surface extending in one direction, a transparent hood closing said reflector, means for sealing the reflector and the hood together to form a sealed closure for the reflecting surface, said hood having a section of its surface also in the form of a surface of revolution extending in the opposite direction from that of the reflecting surface and having an axis common to that of the reflecting surface, said reflecting surface having a focal point lying outside of said hood, and a source of light at the focal point of said reflector, a second section of said hood also in the form of a surface of revolution about an axis non-coincident with said axis, said elements being located in cooperative relation.

3. In combination, a reflector having a focalizing reflecting surface and a hood connected to the reflector by a tight joint and entirely enclosing such surface, said hood having transparent sides tapering toward the axis of the reflector and terminating short of the focal region of the reflector and being provided with a concave wall of transparent material curving about the focal point of the reflector.

4. In combination, a reflector having a focalizing reflecting surface and a hood connected to the reflector by a tight joint and entirely enclosing such surface, said hood having transparent sides tapering toward the axis of the reflector and terminating short of the focal region of the reflector and being provided with a concave wall curving about an axis extending through the focal point of the reflector and extending transverse the axis of the reflector.

5. In a projector, a housing having a window, a light source in said housing in front of the window, a reflector located outside said housing with its reflecting surface facing said window, a transparent hood located between the reflector and the housing and entirely enclosing the reflecting surface, said hood having a portion which covers said window, and means connecting the hood to the rim of the reflector and to the housing, said reflector and hood projecting beyond the casing to define an area for the passage of light from the reflecting surface.

6. In a projector, a housing having a window, a light source in said housing in front of the window, a light interrupter for the light source, means for operating the interrupter, a reflector located outside said housing with its reflecting surface facing said window, a transparent hood located between the reflector and the housing and entirely enclosing the reflecting surface, said hood having a portion which covers said window, and means connecting the hood to the rim of the reflector and to the housing, said reflector and hood projecting beyond the casing to define an area for the passage of light from the reflecting surface.

7. In a projector, the combination of a reflector having a reflecting surface, a transparent hood in front of the reflecting surface which is connected to the rim of the reflector to form a tight joint and to entirely enclose the reflecting surface, a housing of smaller size than the reflector connected to the hood, said housing having an opening facing toward the reflector, and means for supporting a light source in said housing.

8. In a projector, the combination of a reflector having a reflecting surface, a transparent hood in front of the reflecting surface which is connected to the rim of the reflector to form a tight joint and to entirely enclose the reflecting surface, said hood having a centrally inwardly curved portion, a housing attached to the hood, said housing having an opening facing said inwardly curved portion, and means for supporting a light source in said housing, said hood and reflector projecting beyond the confines of the housing to define an area for the passage of light from said reflecting surface.

9. In a projector, the combination of a reflector having a reflecting surface, a transparent hood in front of the reflecting surface which is connected to the rim of the reflector to form a tight joint and to entirely enclose the reflecting surface, a housing of smaller size than the reflector connected to the hood, said housing having an opening facing toward the reflector, means for supporting a light source in said housing, and a movable shutter means in the housing for covering said opening.

In witness whereof, I have hereunto set my hand this 26th day of February, 1924.

CROMWELL A. B. HALVORSON, JR.